L. J. HUNT.
DYNAMO ELECTRIC MACHINE.
APPLICATION FILED MAY 20, 1907.
934,405.
Patented Sept. 14, 1909.
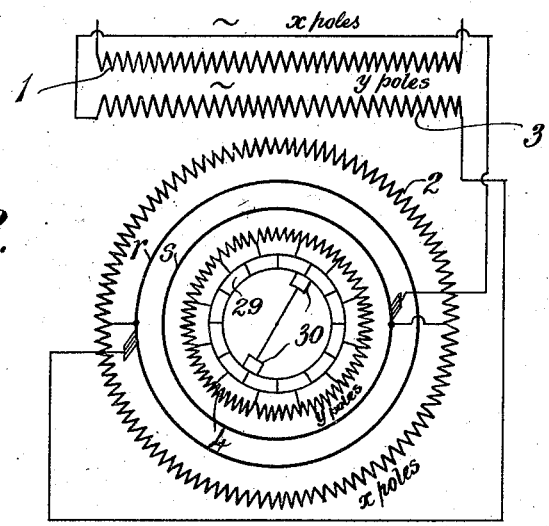
Fig: 2.
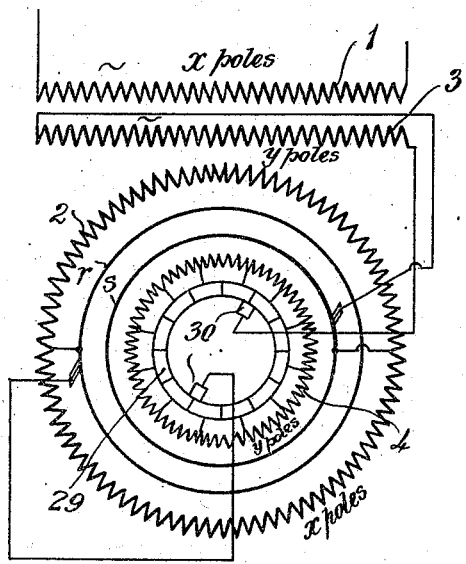
Fig: 1.
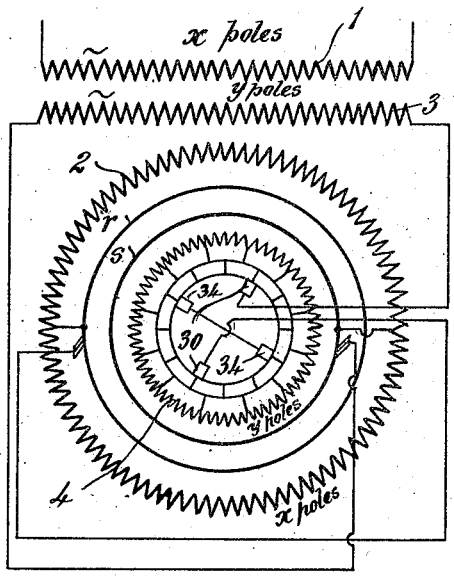
Fig: 3.
Witnesses
Edwin D. Bartlett
Walter G. Park
Inventor
Louis John Hunt
per. Herbert Sefton Jones
Attorney

UNITED STATES PATENT OFFICE.

LOUIS JOHN HUNT, OF SANDYCROFT, NEAR CHESTER, ENGLAND.

DYNAMO-ELECTRIC MACHINE.

934,405.  Specification of Letters Patent.  Patented Sept. 14, 1909.

Original application filed June 22, 1906, Serial No. 322,879. Divided and this application filed May 20, 1907. Serial No. 374,666.

*To all whom it may concern:*

Be it known that I, LOUIS JOHN HUNT, electrical engineer, a subject of the King of Great Britain, residing at The Sandycroft Foundry, Sandycroft, near Chester, in the county of Flint, England, have invented new and useful Improvements in Dynamo-Electric Machines, of which the following is a specification.

This invention relates to the combination upon a single stator and rotor of the windings of an induction motor and those of an alternating current commutator motor, *i. e.* a series motor, a repulsion motor or a series repulsion motor.

As is well known, one of the chief disadvantages of the alternating current series motor is that it cannot be employed upon an electric supply of high frequency—in fact a frequency of 25 is about the limit at which the motor can economically be used; nor can the motor be employed with a high voltage on account of sparking at the commutator, 250 volts being the usual pressure.

According to the present invention the supply for the windings of the series motor part of the machine is obtained from the induced winding—generally the rotor winding—of the induction motor part of the machine. In this way the supply to the series motor windings is rendered independent not only of the frequency of the original supply but also of the voltage, for the ratio of the turns in the stator and rotor windings of the induction motor part can be chosen at will and so also can the ratio of the number of turns of the two windings. Since all the windings are arranged upon a single stator and single rotor, the machine will still be an economical one for it will not involve the high copper losses and high self-induction that would attend the use of a separate induction motor and A. C. series motor. Similar remarks will obviously apply in the case of a repulsion or series repulsion motor.

The invention is diagrammatically illustrated in the accompanying drawing, in which—

Figure 1 shows the induction motor combined with a series motor. Fig. 2 the combination of the induction motor and repulsion motor, and Fig. 3 the combination of an induction and a series repulsion motor.

In Fig. 1, 1 indicates the stator winding for the induction motor part of the machine, and 2 the rotor winding for this part. The rotor winding is joined to slip rings $r$ and $s$, and these in turn are connected, the one to one terminal of the stator winding 3 of the series motor part of the machine, and the other to one of the brushes 30 upon a commutator 29 which is joined to the rotor winding 4 of that part of the machine. The other brush 30 is joined to the remaining terminal of the stator winding 3 so as to put the stator and rotor winding in series. The terminals of the stator winding 1 are joined to a source of alternating electric current supply, and the alternating flux thus produced in the iron of the stator induces current in the rotor winding 2. As the machine begins to rotate, the frequency of the current in the rotor winding 2 will diminish, this frequency being always governed by the difference between the speed of the rotor and synchronous speed. Moreover if there are fewer turns on the rotor than on the stator the currents generated in the latter will have a less voltage than that of the supply to the stator winding 1. These currents of the reduced voltage and frequency pass into the stator winding 3 and through the brushes 30 and commutator 29 to the rotor winding 4. These two windings therefore act precisely like an ordinary A. C. series motor, and obviously by suitably designing the windings 1 and 2 the voltage and frequency of the supply to the windings 3 and 4 may be fixed as required.

In Fig. 2 the brushes 30 are short-circuited and this of course makes the windings 3 and 4 act like those of a repulsion motor. Except for this change the action is exactly as above described.

In Fig. 3 the parts of the series motor are all present just as in Fig. 1, but a second pair of brushes 34 is added electrically at right angles to the brushes 30 and these brushes are short-circuited together. As a result, the windings 3 and 4 now act as those of a series repulsion motor deriving its supply from the rotor winding 2. Otherwise the action is exactly that described with reference to Fig. 1 and therefore need not be further detailed.

It is only necessary to re-assert what appears from the introduction, that the windings 1 and 3 are upon a single stator and the windings 2 and 4 are upon a single rotor. It will be understood that the rotor windings or the stator winding which is in series with them, may be wound for any number of phases, and any known means of compensation may be used.

The pole members of the two windings on each part must be so chosen as to make the windings mutually non-inductive, as is set forth in my previous application, Serial No. 322,879 filed June 22nd. 1906, of which the present application is a division.

What I claim is:

1. In a dynamo-electric machine, the combination of a stationary part and a rotary part, a winding on said stationary part adapted to be connected to a source of electric supply, a winding on the rotary part, a second winding on the stationary part, connections between said second winding and the winding on the rotary part, a second winding on the rotary part, a commutator joined thereto, brushes on said commutator, and connections to said brushes whereby currents are permitted to pass through said commutator and the winding connected thereto.

2. In a dynamo-electric machine, the combination of a stationary part and a rotary part, a winding on said stationary part adapted to be connected to a source of electric supply, a winding on the rotary part, a second winding on the stationary part, a commutator on the rotary part, brushes on said commutator, connections joining said brushes the winding on the rotary part and the second winding on the stationary part in series, and a second winding on the rotary part joined to the commutator.

3. In a dynamo-electric machine, the combination of a stationary part and a rotary part, a winding on said stationary part adapted to be connected to a source of electric supply, a winding on the rotary part, a second winding on the stationary part, a commutator on the rotary part, brushes on said commutator, connections joining said brushes the winding on the rotary part and the second winding on the stationary part in series, a second winding on the rotary part joined to the commutator, and a second set of brushes on said commutator, electrically at right angles to the first set and short-circuited together.

In testimony whereof I have signed my name to this specification in the presence of two subscribing witnesses.

LOUIS JOHN HUNT.

Witnesses:
 H. WATSON,
 W. McMULLEN.